4/5/88 OR 4,735,096

United States Patent [19]

Dorr

[11] Patent Number: 4,735,096

[45] Date of Patent: Apr. 5, 1988

[54] ULTRASONIC TRANSDUCER

[75] Inventor: John A. Dorr, Crofton, Md.

[73] Assignee: Xecutek Corporation, Crofton, Md.

[21] Appl. No.: 900,854

[22] Filed: Aug. 27, 1986

[51] Int. Cl.[4] .................... G01M 7/00

[52] U.S. Cl. .................... 73/662; 310/325

[58] Field of Search .................... 73/662; 310/322, 323, 310/324, 325, 328, 334

[56] References Cited

U.S. PATENT DOCUMENTS 3,329,408 7/1967 Branson .................... 310/325 X 3,370,186 2/1968 Antonevich .................... 310/325

*Primary Examiner*—Jerry W. Myracle

*Attorney, Agent, or Firm*—Jim Zegeer

[57] ABSTRACT

An ultrasonic transducer is comprised of a stack or sandwich of electrostrictive elements, an energy reflecting mass at one end of the column or stack of electrostrictive elements and a pair of laminar plates sandwiching a honeycomb core to constitute an extremely rigid, light mass member contacting a fluid medium in which ultrasonic energy is to be introduced. The output member is characterized by having a high shear modulus and a low density at the opposite end for efficiently coupling the ultrasonic energy into the fluid medium, particularly air and has a narrow beam and a very long range.

3 Claims, 1 Drawing Sheet

FIG. 1
PRIOR ART
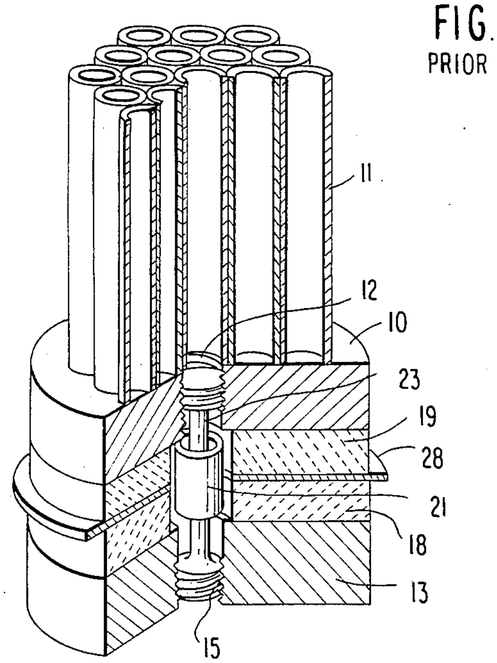
FIG. 2
PRIOR ART
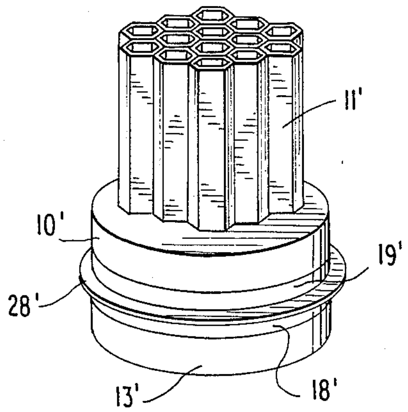
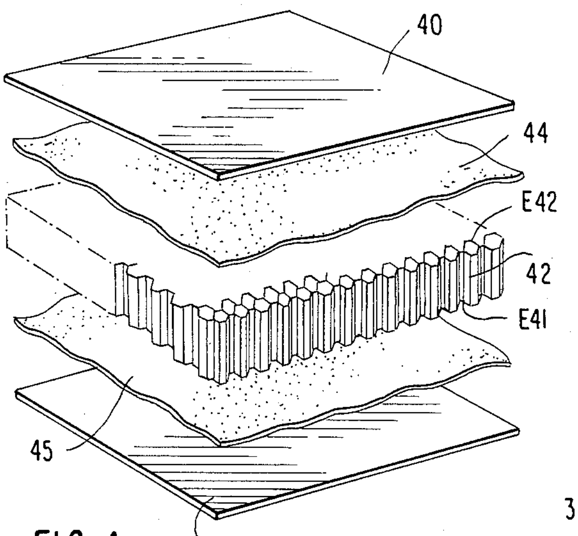
FIG. 4
FIG. 3
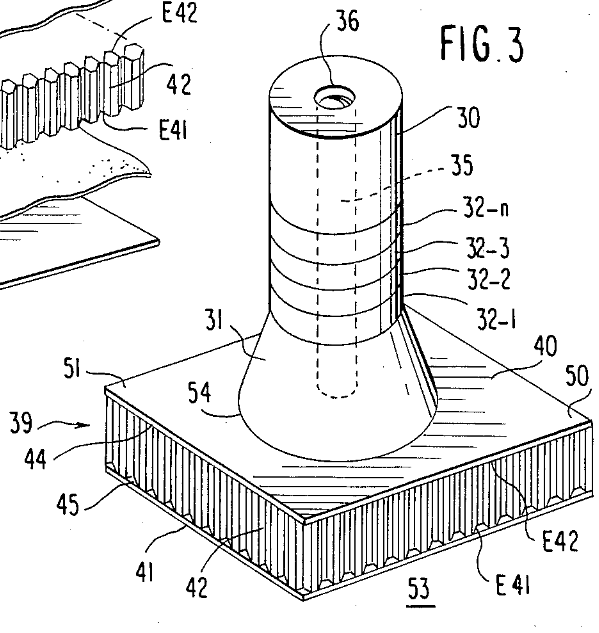

ULTRASONIC TRANSDUCER

BACKGROUND AND BRIEF DESCRIPTION OF THE INVENTION

The invention relates to ultrasonic transducers and more particularly ultrasonic transducers of the Tonpilz arrangement in which a stack of piezoelectric ceramic driver elements or disks are stacked in push-pull relation and held together between a heavy mass element such as a steel disk and an aluminum coupling element with the piezoelectric ceramic disks being excited in push-pull relation so as to allow for higher exciting voltages. The sandwich is held together by a prestress bolt. Such a system is disclosed in Antonevich U.S. Pat. No. 3,370,186 from which FIGS. 1 and 2 hereof have been taken. In Antonevich, the output member is a perforated metal member which takes the form of a labyrnith structure or any of a variety of cross-sectional forms and degree of perforation to provide predictable acoustical impedance. For example, the member may be built up of tubular members metalurgically bonded to the base or the member may take the form of a honey-comb structure set into a proper base.

According to this invention a pair of laminar graphite epoxy sheets adhesively sandwiched to the opposite sides of a honeycomb core provides an extremely low mass but extremely rigid plate member which is secured either by an adhesive such as an epoxy adhesive to an aluminum plate at the output end of the stack of electrostrictive elements. Thus, the ultrasonic transducer ensemble comprises a mass which preferably is a steel disk to provide a null, a stack of piezoelectric ceramic driven disks connected in push-pull relation to allow higher voltages on the ceramics to enhance more energy input thereto, a lower mass aluminum disk so that the piezoelectric driver disk are sandwiched between a steel metal mass and an aluminum metal mass and drawn tightly together by a prestressed tie rod member or bolt; and, according to the invention, the coupling of the ultrasonic energy from the output end of the stack of piezoelectric ceramic driven disks is by means of a rigid, light weight, low mass member having a pair of rigid laminates adhesively sandwiching a light-weight structure which preferably is a honeycomb oriented in a direction coaxial with the axis of the stack of ceramic disks and boundedly secured at each honeycomb end to the laminates so that the shear modulus is extremely high and the density of the composite structure is thus very low so that the lateral or outer ends of the laminate cannot flap or move out of phase with the central portion. The velocity of the shear wave in the honey-comb thus is made as high as possible. In operation, the metal mass reflects the energy into the ceramic mass and the mass thus acts as a node so that all energy iss delivered to the front end where there is a very low or no mass. There is less loss of energy in the transducer per se and more energy is efficiently coupled to a load because of the larger surface of the laminates contacting the fluid medium. In air, the transducer has an especially good impedance match resulting in a longer range for essentially the same energy input as compared to prior art systems.

BRIEF DESCRIPTION OF THE DRAWINGS

The above and other objects, advantages and features of the invention will be apparent from a consideration of the following specification and accompanying drawings wherein:

FIG. 1 is an isometric view partly in section of a prior art transducer corresponding to FIG. 2 of the above-referenced Antonevich U.S. Pat. No. 3,370,186, FIG. 2 shows an isometric view of a further embodiment of the prior art Antonevich disclosure corresponding to FIG. 3 thereof, FIG. 3 is an isometric view of a preferred embodiment of the present invention, FIG. 4 is an enlarged sectional view showing the laminate pair sandwiching a honey-comb structure to achieve the high degree of rigidity and light-weight structure for coupling the acoustic energy into the load.

DETAILED DESCRIPTION OF THE INVENTION

In the prior art shown in FIG. 1, a perforated mass consists of a steel plate 10 having metallurgically attached an array of tubes 11 which has a tapped hole 12 axially thereof. The imperforate mass 13 is cylindrical having a tapped hole 15 located along its axis. Sandwiched between the mass plates 10 and 13 are of electrostrictive elements 18, 19 separated by an electrical insulating tube 21. A stud 21 is threaded into tapped holes 22 and 23 in imperforate mass 15 and steel plate 10. The assembly is held together and prestressed by turning imperforate cylindrical mass 12 on stud 20. In the prior art shown in FIG. 2, a further transducer corresponding to FIG. 3 of Antonevich U.S. Pat. No. 3,370,186 is similar to the transducer shown in FIG. 1 except here, the perforate mass consists of elongated hexagonal members which are metallurgically attached by welding or brazing to plate 28 to form the perforate structure in the typical form of a honeycomb. Thus, in this prior art construction, the basic objective is to utilize the same density materials to produce a transducer which can be welded, brazed or otherwise metallurgically bonded to a load which is to be treated and eliminates the so-called undesirable adhesive-type bond between transducer and load and permits air cooling since the spaces in the labyrnith permit the gas or liquid to flow.

THE TRANSDUCER CONSTRUCTION ACCORDING TO THE PRESENT INVENTION

As shown in FIG. 3, the mass 30 serves an an ultrasonically reflecting end piece and truncated aluminum cone member 31 serves as the opposite sandwich member sandwiching therebetween a stack of piezoelectric ceramic driver disks 32-1, 32-2, 32-3 . . . 32-n, which are stacked and connected in push-pull fashion to allow higher voltages on the ceramic disks and thus provide a higher driving force. The layered construction is held together by a stress bolt 35 which is threadably engaged with bores 36 in mass 30 and bore 37 in truncated aluminum cone member 31.

The invention incorporates a lightweight, low mass laminate sandwich 39 comprised of two rigid face sheets 40, 41 spacedly joined by a honeycomb structure 42 which is adhesively secured at all ends or edges E41 and E42 of the honeycomb to laminate plates 40, 41 by adhesive layers or sheets 44 and 45 to assure extreme rigidity and lightweight and thus assure a high shear modulus and low density member. The structure shown in exploded form in prior art FIG. 4 is described in greater detail in E. I. Dupont de Nemours Co., Inc. phamplet entitled "Design and Fabrication Techniques of NOMEX ® ARAM Sandwich Structures" which is incorporated herein in its entirety by reference. The rigidity is such that the lateral extremities 50, 51 cannot flap or move out of phase with the central portion 52 to thereby assure a maximum coupling of ultrasonic energy into the fluid medium 53. The honeycomb core 42 the DuPont Company's can be NOMEX ® brand honeycomb. The face sheets or lamina 40, 41 are bonded by adhesive layers 44 and 45 to all the ends or edge surfaces of honeycomb. The upper laminate 40 is adhesively bonded to the lower base of the truncated cone aluminum member 31 by an adhesive 54. This assures that the face 40 is as rigid as possible. The metal mass 30 acts as a node as a node so that all energy is delivered to the output end where there is a substantially no mass and hence very little energy loss. The rigidity of the sandwich 39 is such as to assure that the phase is the same across the face of the output laminate 41 which couples the output energy into the medium 53. The cells of the honeycomb core are relatively small so that only a small area of laminate is unsupported across the ends E41 and E42, thereby increasing the rigidity of the structure while maintaining it very light and of low mass.

Thus, transducers incorporating the invention are highly efficient in coupling ultrasonic energy to air, low in cost and easy to fabricate.

While I have disclosed a particular and preferred embodiment of the invention, it will be appreciated that the invention may be modified and adapted in other ways than those disclosed herein by those skilled in the art and it is intended to encompass such obvious modifications and adaptations within the spirit and scope of the following claims.

What is claimed is:

1. An ultrasonic transducer comprising in combination a stack of electrostrictive disks electrically connected in push-pull relation, a back plate of solid material on one side of said stack of electrostrictive means, a front plate on the opposite side of said stack of electrostrictive members and a rigid low mass plate member comprised of a pair of laminates, a honeycomb core structure and adhesive means securing said pair of laminate opposing ends of said honeycomb core structure so that the shear modulus is high and the density thereof is low whereby the velocity of the shear wave in the honeycomb is as high as possible and the lateral ends of said member cannot flap out of phase with the central portion thereof.

2. The ultrasonic transducer defined in claim 1 wherein at least one of said laminates is constituted by fiber elements bound in a resin matrix.

3. A method of coupling ultrasonic energy from an electrorestrictive transducer assembly to an air load comprising, providing between a large steel mass and an aluminum member, coupling the ultrasonic energy passing through said aluminum member to air via a pair of laminate sheets adhesively bonded to the respective ends of a small celled honeycomb, the rigidity of said pair of laminate sheets, adhesive, and said small celled honeycomb being such as to assure that the acoustic phase is the same across the one of said laminate interfacing the acoustic energy to air.

* * * * *